United States Patent [19]

Mirov et al.

[11] Patent Number: 5,471,493
[45] Date of Patent: Nov. 28, 1995

[54] SC$^{2+}$ BASED ACTIVE CRYSTALLINE LUMINESCENT MEDIA FOR LASER SYSTEMS TUNABLE IN UV-VISIBLE SPECTRAL RANGE

[75] Inventors: Sergey B. Mirov, Birmingham; William A. Sibley, Homewood, both of Ala.

[73] Assignee: The UAB Research Foundation, Birmingham, Ala.

[21] Appl. No.: 308,102

[22] Filed: Sep. 16, 1994

[51] Int. Cl.$^6$ .............................................. H01S 3/16
[52] U.S. Cl. .............................................. 372/42; 372/39
[58] Field of Search .............................................. 372/42, 39

[56] References Cited

FOREIGN PATENT DOCUMENTS 1556493  12/1989  U.S.S.R. .

OTHER PUBLICATIONS

Hochli et al; Parmagnetic Resonance Study of the Dynamic Jahn–Teller Effects in CaF2:Sc+2 and SrF2.Sc+2, "Physical Review Letters", 18(4); pp. 128–130; 1967 (No month).
Fabeni et al., "Impurity Centers for Tunable Lasers in the Ultraviolet and Visible Regions," *J. Phys. Chem. Solids*, 52(1):299–317, Mar., 1991.
Höchli and Estle, "Paramagnetic–Resonance Study of the Dynamic Jahn–Teller Effect in CaF$_2$:Sc$^{2+}$ and SrF$_2$:Sc$^{2+}$," *Physical Review Letters*, 18(4):128–130, Jan., 1967.
Höchli, U. T., "Jahn–Teller Effect of d$^1$ Ion in Eightfold Cubic Coordination," *Physical Review*, 162(2):262–273, Oct., 1967.
Moulton, P. F., "Spectoscopic and Laser Characteristics of Ti:Al$_2$O$_3$," *J. Opt. Soc. Am. B*, 3(1):125–134, Jan., 1982.
Moulton, Peter F., "An Investigation of the Co:MgF$_2$ Laser System," *IEEE Journal of Quantum Electronics*, QE–21(10):1582–1595, Oct., 1985.
Moulton, Peter, "Ti–doped Sapphire: Tunable Solid–state Laser," *Optics News*, p. 9, Nov./Dec., 1982.
Schwotzer et al., "Donor–Acceptor Pairs in Ionic Crystals," *Izvestiya Akademii Nauk SSSR. Seriya Fizicheskaya*, 37(4):810–817, Apr., 1973.

*Primary Examiner*—Leon Scott, Jr.
*Attorney, Agent, or Firm*—Arnold, White & Durkee

[57] ABSTRACT

Disclosed is the use of Sc$^{2+}$ based active crystalline luminescent media for laser systems, tunable in the UV-visible spectral range. The crystalline media are Sc-doped alkali-earth-halide crystals such as: (1) alkali-earth-halide combinations, such as MeF$_2$, MeCl$_2$,crystals; (2) mixed alkali-earth metal fluorides and chlorides, such as MeFCl, M$_x$Me$_{1-x}$F$_2$ and M$_x$Me$_{1-x}$Cl$_2$ crystals; and (3) complex fluoride crystals; wherein M and Me are Ca, Sr, Ba or Mg. These crystals have Sc$^{2+}$ ion impurities providing stable optical centers that yield advantageous luminescent properties. The base crystal structure utilized determines the luminescent emission spectrum for the Sc$^{2+}$ optical centers. By manipulating the base crystal, the maxima of the absorption and emission bands may be altered from UV-blue to red in the optical spectrum. The Sc$^{2+}$ active crystalline luminescent media are initially doped with trivalent Sc$^{3+}$ ions during crystal growth. The crystals are then subjected to subsequent processing, such as ionizing irradiation, additive calcining coloration, or electrolytic coloration, to transform Sc$^{3+}$ ion impurities into an Sc$^{2+}$ electron configuration.

21 Claims, 8 Drawing Sheets

$Sc^{2+}$ BASED ACTIVE CRYSTALLINE LUMINESCENT MEDIA FOR LASER SYSTEMS TUNABLE IN UV-VISIBLE SPECTRAL RANGE

BACKGROUND OF THE INVENTION

1. Field of the Invention

The present invention relates to the field of active crystalline luminescent media. In particular, the present invention relates to doped active crystalline media for laser systems, tunable in the ultraviolet ("UV") to visible spectral range.

2. Background

Over the last fifteen years the laser community has shown an increasing interest and has shown some success in developing tunable laser systems. Interest in tunable laser systems has increased primarily because of the superior output characteristics of these laser systems, which give rise to numerous promising applications, such as use in ranging, lidar and optical communications, diagnostic and therapeutic medicine, photochemistry and photobiology, environmental monitoring, and kinetic and ultra-fast laser spectroscopy.

Active crystalline luminescent media usable for tunable laser systems may generally be classified into four different groups. The classification of a particular crystal within these four groups depends upon the particular crystal's working optical center. The working optical center is the structural feature of the crystal which provides the optical properties necessary for use in tunable laser systems.

The first group of active crystalline luminescent media is made up of impurity doped crystals. Crystalline media that fall into this group include crystals, such as chromium activated alexandrite, rare earth aluminum garnets, yttrium aluminum garnets, forsterite, complex fluorides (e.g. LiCaF, LiSaF, etc.) and titanium doped sapphire. Active crystalline media that fall within this first group obtain laser properties at the stage of crystal growth, when the melt is doped with a metal ion impurity.

The second group of active crystalline luminescent media is made up of color center crystals. Active crystalline media that fall within this second group include crystals having intrinsic, radiationally, additively or electrolytically induced F centers, which provide laser properties. Such crystals mainly include alkali-halide crystals, alkali-earth fluoride crystals and some oxide crystals (e.g., $Al_2O_3$). Color center crystals are colorless and optically transparent in their primal state after crystal growth. They acquire laser properties only after additional crystal treatment. This additional treatment may include ionizing irradiation (e.g., irradiating with γ-rays, x-rays, electrons, neutrons, etc.) or calcining in an alkali-metal vapor (i.e., additive coloration). The working optical centers of active crystalline media falling within this second group are complexes derived from F center defects in the crystal lattice. An F center defect is one of the simplest intrinsic point defects in the crystal structure.

The third group of active crystalline luminescent media includes crystals with complex optical dipoles caused by impurities adjacent to F center defects. The active crystalline media that fall within this third group may be divided into two subgroups. The first subgroup includes crystals having optical centers, which provide laser properties, that are represented by color centers, perturbed by neighboring impurities. Crystals that fall into this first subgroup include: $F_2^+{}^*$ -$F_2^+$ centers, perturbed by $Me^{++}$ ions in LiF and NaF crystals; $F^{+**}$ -$F_2^+$ centers, perturbed by O–ions in LiF, NaF, NaCl, KCl and KBr crystals; $(F_2^+)_A$-$F_2^+$ centers, perturbed by Li in NaF and KCl crystals; and $(F_2)_A$-$F_2$ centers, perturbed by Na ions in $CaF_2$ and $SrF_2$ crystals. The second subgroup includes crystals having optical centers, which provide laser properties, represented by impurity ions, perturbed by a neighboring color centers. For example, $Cr^{4+}$ doped YAG crystals (i.e., YAG:$Cr^{4+}$) likely fall within this subgroup. Other crystal that fall into this group include $RbMgF_3$ and $KMgF_3$ crystals that are doped with $Mn^{2+}$. These crystals show enormous, but temporary, oscillator strength, which increases after ionizing irradiation.

The fourth, and last, group of active crystalline luminescent media includes impurity doped crystals that have no laser properties in their primal state after crystal growth and that acquire laser properties only after subsequent processing. In these crystals, ionizing irradiation causes metal ion impurities to permanently change their electronic state and valence structure to provide laser properties. Active crystalline media that fall within this category include some of the first laser crystals such as $CaF_2$:$Sm^{2+}$, $CaF_2$:$Dy^{2+}$ and $CaF_2$:$Tm^{2+}$. These crystals may be produced utilizing a procedure of additive coloration or ionizing radiation to transform the rare-earth impurity (Re) from a $Re^{3+}$ ion impurity to a $Re^{2+}$ ion impurity. Other crystals that fall within this category are $SrF_2$ crystals doped with neodymium ions that have been treated with ionizing irradiation. The ionizing radiation transforms a portion of the $Nd^{3+}$ ion impurities in the $SrF_2$ crystals into $Nd^{2+}$ ion impurities. $SrF_2$:$Nd^{2+}$ active crystalline media have adequate nonlinear saturation properties for laser system purposes in the infrared range of the optical spectrum from 1.1 µm to 1.6 µm wavelengths. $SrF_2$:$Nd^{2+}$ crystals were the first solid state passive Q-Switches and mode lockers for resonators of solid state lasers in the above mentioned spectral range.

Prior active crystalline luminescent media for tunable laser systems have numerous disadvantages. For example, laser oscillation for many of these crystals may be suppressed by competing processes, such as: (1) optical bleaching and optical center degradation due to irradiation from the laser pumping system; (2) spontaneous thermal or thermo-optical degradation of the optical center at room temperature; (3) the presence of parasitic absorption in the emission region; (4) absorption in the emission region induced by pump radiation; (5) nonlinear losses due to the excited state absorption; (6) losses from triplet state formation; and (7) overlapping of absorption bands from different optical centers.

Among prior active crystalline luminescent media for tunable laser systems, $Ti^{3+}$ doped sapphire crystals (i.e., Ti:$Al_2O_3$ crystals) are practically free from the above-mentioned shortcomings and feature advantageous spectroscopic characteristics. In particular, because of the absence of excited state absorption, which is due to $d^1$ electron configuration of $Ti^{3+}$ ion impurity, a Ti:$Al_2O_3$ laser crystal medium can lase over the entire fluorescence region and feature a much higher gain cross section than other transition-metal crystalline media for tunable laser systems. Laser systems utilizing Ti-sapphire active crystalline media have a low sensitivity to the quality of the optical elements within the laser cavity and to the spatial, angular and spectral characteristics of the pump radiation. The spectroscopic and laser characteristics of Ti:$Al_2O_3$ crystals is described in P. E. Moulton, "Spectroscopic and Laser Characteristics of Ti:$Al_2O_3$", J. Opt. Soc. Am. B., vol. 3, no. 1, at 125–33 (January 1986).

In an electron paramagnetic-resonance ("EPR") study of the dynamic Jahn-Teller effect, the electron configurations of $CaF_2$ and $SrF_2$ crystals having Sc ion impurities were analyzed. In these studies, a $CaF_2$ crystal and a $SrF_2$ crystal were plated with Sc metal by condensation from Sc vapor. After processing to allow for diffusion of Sc ions into the crystals, $Sc^{3+}$ ion impurity concentrations of about 120 parts per million for $CaF_2$ and 30 parts per million for $SrF_2$ were apparently obtained at some point in the crystals. The crystals were X-irradiated at room temperature. EPR spectrum analysis was used to prove the existence of $Sc^{2+}$ ion impurities at cubic sites of the crystal lattice for these crystals. No optical or luminescent data could be obtained. This processing method of diffusing Sc ions into the crystal is not usable for preparing laser active elements. This processing yields an extremely low and nonhomogeneous distribution of Sc ions and, therefore, these crystals are not laser active. A discussion of this study is described in U. T. Hochli, "Jahn-Teller Effect of a $d^1$ Ion in Eightfold Cubic Coordination," Phys. Rev., vol. 162, no. 2, at 262–73 (October 1967); U. T. Hochli, "Paramagnetic-Resonance Study of the Dynamic Jahn-Teller Effect In $CaF_2:Sc^{2+}$ and $SrF_2:Sc^{2+}$," Phys. Rev. Lett., vol. 18, no. 4, at 128–30 (January 1967).

In summary, there are a great variety of crystalline hosts having dopant ions and/or intrinsic color centers that may yield active crystalline luminescent media having adequate properties for use in tunable laser systems. A practical active crystalline luminescent media would be based upon crystals that: (1) have a high concentration of the active optical centers that are both photo-stable and thermo-stable; (2) can be grown to a size and optical quality sufficient to produce energies and beam qualities needed for most applications; (3) feature laser operation at or above room temperatures; and (4) feature a sufficiently large stimulated emission cross section that is much larger than possible parasitic losses and excited state absorption.

The goal of the present invention is to combine the advantages of the technologically well developed and relatively inexpensive fluoride and chloride doped crystals and subsequent ionizing treatment of the crystals to develop practical active crystalline luminescent media, particularly for use in lasers tunable in the UV-visible range of the optical spectrum.

SUMMARY OF THE INVENTION

The present invention contemplates Sc-doped alkali-earth-halide active crystalline luminescent media that have surprisingly advantageous luminescent properties due to optical centers provided by $Sc^{2+}$ ion impurities. The $Sc^{2+}$ ion impurities in the crystalline media of the present invention produce an electron configuration and emission and absorption bands analogous to a Ti-doped sapphire crystalline laser media, providing significant advantages over prior active luminescent crystalline media, particularly for tunable laser systems. Compared to the Ti-doped sapphire crystalline laser media, the crystalline media of the present invention feature absorption and emission bands shifted in the UV-visible range of the optical spectrum. As with the $Ti^{3+}$ ion impurities, the $Sc^{2+}$ ion impurities have no energy levels above the upper laser emission band level that can cause excited state absorption. Excited state absorption adversely affects the laser operation of many transition-metal doped crystalline media and other crystalline media and results in the crystalline laser medium absorbing the laser radiation it generates. This excited state absorption lowers the laser efficiency of the medium and reduces the potential tuning range for the laser system. Thus, the present invention provides a practical realization of tunable UV-visible laser systems, analogous to Ti-sapphire laser systems operating in the IR spectrum, by developing and applying $Sc^{2+}$ doped active crystalline luminescent media.

$Sc^{2+}$ active crystalline luminescent media according to the present invention feature wide absorption and emission bands, with cross sections of absorption and stimulated emission greater than $10^{-19}$ $cm^2$. These wide bands and the unique $d^1$ electronic configuration (similar to $Ti^{3+}$ in sapphire), which features an absence of excited state absorption, make the $Sc^{2+}$ active crystalline luminescent media according to the present invention advantageous active materials for lasers tunable in the UV-visible spectral range.

The present invention contemplates an active $Sc^{2+}$ crystalline luminescent medium including an alkali-earth-halide crystal having $Sc^{2+}$ ion impurities providing stable luminescent optical centers. The present invention further contemplates the alkali-earth-halide crystal having the formula MeHa, wherein Me is an alkali-earth metal selected from a group consisting of Ca, Sr, Ba and Mg; and Ha is a halide combination selected from a group consisting of $F_2$, $Cl_2$ and FCl. In particular, the present invention contemplates Me being Ca, Ha being $F_2$, and the $Sc^{2+}$ ion impurities having a concentration of approximately 0.0004 to 5.0 atomic percent. The present invention also contemplates the alkali-earth-halide crystal having the formula $M_xMe_{1-x}Ha$ (x being 0–1), wherein M is an alkali-earth metal selected from a group consisting of Ca, Sr, Ba and Mg; Me is an alkali-earth metal selected from a group consisting of Ca, Sr, Ba and Mg, excluding the alkali-earth metal selected for M; and Ha is a halide selected from a group consisting of $F_2$, $Cl_2$ and FCl. The present invention still further contemplates the alkali-earth-halide crystal having the formula $MMeF_3$, wherein M is an alkali metal selected from a group consisting of Li, Na and K; and Me is an alkali-earth metal selected from a group consisting of Ca, Sr, Ba, Mg and Zn.

The present invention also contemplates a method for producing an $Sc^{2+}$ active crystalline luminescent medium, including the steps of producing an alkali-earth-halide crystal having $Sc^{3+}$ ion impurities, and processing said alkali-earth-halide crystal to transform said $Sc^{3+}$ ion impurities into $Sc^{2+}$ stable luminescent optical centers. In particular, the processing step is contemplated as processing the alkali-earth-halide crystal to transform substantially all of said $Sc^{3+}$ ion impurities into $Sc^{2+}$ stable luminescent optical centers. In particular, the producing step is contemplated as growing an alkali-earth-halide crystal from a melt doped with $Sc^{3+}$ ion impurities. The present invention further contemplates the processing step including the steps of polishing the alkali-earth-halide crystal, irradiating the alkali-earth-halide crystal with ionizing irradiation to transform $Sc^{3+}$ ion impurities into $Sc^{2+}$ ion impurities, and subjecting the irradiated alkali-earth-halide crystal with photo-treatment and thermo-annealing. The present invention also contemplates the processing step including the steps of processing the alkali-earth-halide crystal with additive or electrolytic coloration to transform $Sc^{3+}$ ion impurities into $Sc^{2+}$ ion impurities, processing the colored alkali-earth-halide crystal with thermal annealing, and polishing the alkali-earth-halide crystal.

The present invention further contemplates a tunable laser system having output radiation tunable in the UV-visible spectral range, including a pumping system, an $Sc^{2+}$ active crystalline luminescent medium coupled to the pumping system to receive pumping radiation from the pumping system and emit output radiation in the UV-visible spectral range, and a dispersive system coupled to the pumping system and the $Sc^{2+}$ active crystalline luminescent medium to tone the output radiation in the UV-visible spectral range. The active crystalline luminescent medium is an alkali-earth-halide crystal having $Sc^{2+}$ ion impurities providing stable luminescent optical centers.

The advantages of the present invention will be further appreciated from the drawings and from the detailed description provided below.

BRIEF DESCRIPTION OF THE DRAWINGS

The herein described advantages and features of the present invention, as well as others which will become apparent, are attained and can be understood in more detail by reference to the following description and appended drawings, which form a part of this specification.

It is to be noted, however, that the appended drawings illustrate only exemplary embodiments of the invention and are therefore not to be considered limiting of its scope, for the invention may admit to other equally effective embodiments.

DETAILED DESCRIPTION

As active crystalline luminescent media for tunable laser systems, the alkali-earth-halide crystals according to the present invention have some essential advantages over expensive oxide crystals. In particular, the crystal growth technology for growing crystals according to the present invention is well developed, and high-quality crystals, having low hygroscopicity, reasonably consistent concentrations of Sc ion impurities across the crystal, and reasonable mechanical and thermal strength, may be easily produced with large cross-sections and volumes on a large scale commercial level. $Sc^{2+}$ active crystalline luminescent media according to the present invention have stable $Sc^{2+}$ impurity concentrations that yield surprisingly advantageous optical properties that are particularly advantageous for tunable laser systems.

Figure 1:
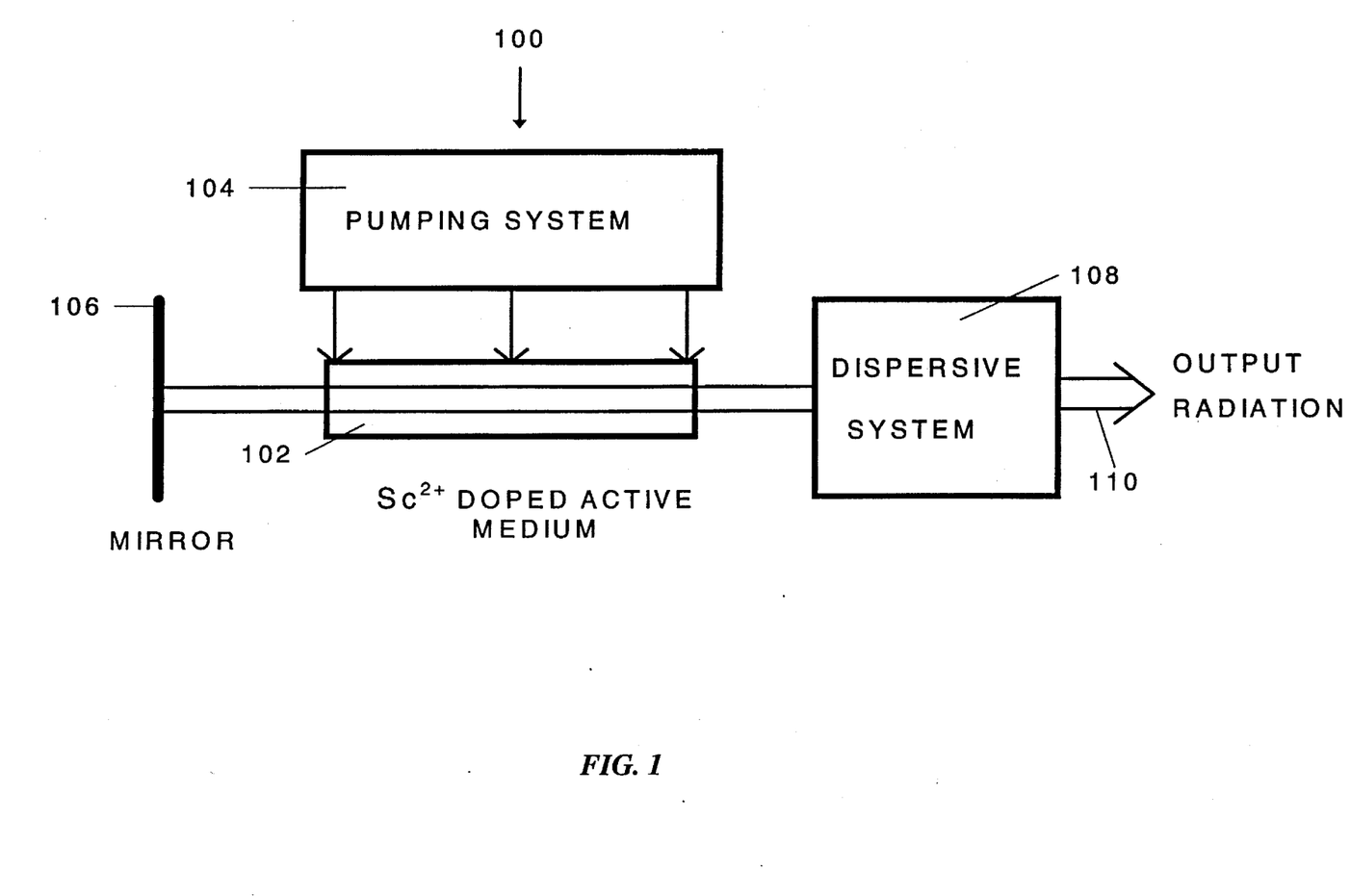
FIG. 1 is a block diagram of an embodiment of a tunable laser system according to the present invention.

FIG. 1 is a block diagram of tunable laser system 100 having $Sc^{2+}$ doped active crystalline luminescent medium 102 according to the present invention. Tunable laser system 100 may include traditional components for tunable lasers such as: pumping system 104, an active medium, rear mirror 106, and dispersive system 108. Dispersive system 108 may include a diffractive grating to provide narrowband frequency tuning of the laser output (by rotating the grating) across the broad amplification band of the active medium. Pumping system 104 may also include a reshaping-focusing system. According to the present invention, the active crystalline luminescent medium is $Sc^{2+}$ doped active medium 102. The tunable laser system 100 produces tuned output radiation 110. The optical cavity, in which $Sc^{2+}$ doped active medium is placed, may be similar to the conventional optical cavity for tunable laser systems having a tunable dye, color center, or transitional-metal doped active crystalline luminescent medium.

Pumping system 104 provides radiation to stimulate active medium 102 and may be commercially available neodymium lasers (266 nm to 354 nm), alexandrite lasers (third harmonic), excimer lasers, or direct flashlamp excitation. Dispersive system 108 provides the separation of a particular narrow spectral line of coherent radiation from the stimulated emission and guides this coherent radiation through multiple passes along a particular path through the active medium to generate laser radiation of the desired wavelength. Tumble laser systems according to the present invention may be tuned using conventional techniques known to those of skill in the art. For example, a diffraction grating may be rotatably mounted about an axis orthogonal to the laser axis and parallel to the grating plane to promote adjustment of the oscillation frequency. As the diffraction grating is rotated into adjustment about an axis parallel to its grooves and perpendicular to the laser axis, stimulated laser radiation output would appear at the wavelength determined by the grating.

Applications for a tumble laser system with a $Sc^{2+}$ active crystalline luminescent medium of the present invention include solving problems in various fields of science and technology, such as laser spectroscopy, photochemistry, photobiology, medicine, underwater communications, and other fields in which a tunable laser output is needed. It is understood that the $Sc^{2+}$ active crystalline luminescent media of the present invention may also be used in other systems that would take advantage of the luminescent properties of the present invention as would be recognized by one of skill in the art.

Figure 2:
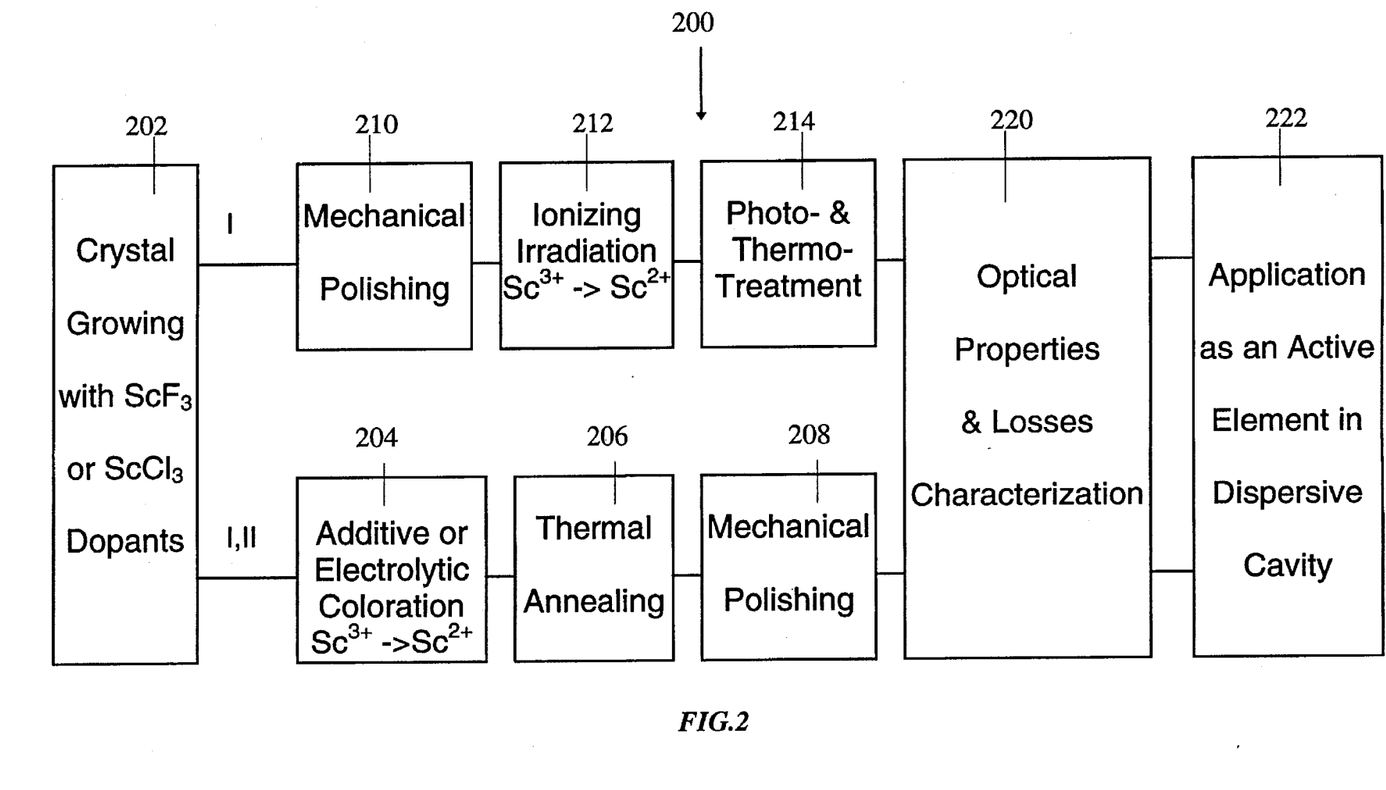
FIG. 2 is a flow chart of an embodiment of a method for producing $Sc^{2+}$ active crystalline luminescent media according to the present invention.

FIG. 2 is a flow chart for an embodiment of a method for producing $Sc^{2+}$ active crystalline luminescent media according to the present invention. Media production method 200 includes three separate processing paths represented by Roman numerals I, II, and III.

In procedural step 202, a crystalline media is grown. The $Sc^{2+}$ alkali-earth-halide active crystalline media according to the present invention may be: (1) alkali-earth-halide crystals having the formula MeHa (Me represents an alkali-earth metal selected from a group consisting of Ca, Sr, Ba and Mg; Ha represents a halide combination selected from a group consisting of $F_2$, $Cl_2$ and FCl); (2) a mixed alkali-earth halides having the formula $M_xMe_{1-x}Ha$ (0 <x<1; M represents an alkali-earth metal selected from a group consisting of Ca, Sr, Ba and Mg; Me represents alkali-earth metals selected from a group consisting of Ca, Sr, Ba and Mg, excluding the alkali-earth metal selected for M; Ha represents a halide selected from a group consisting of $F_2$, $Cl_2$ and FCl); and (3) complex fluoride crystals having the formula: $MMeF_3$ (M represents alkali metals selected from a group of Li, Na and K; Me represents alkali-earth metals selected from a group consisting of Ca, Sr, Ba, Mg and Zn). The doping in procedural step 202 dopes the crystalline media with $Sc^{3+}$ ions during crystal growth. The impurity $Sc^{3+}$ cations are introduced into the melt by the addition of halide salt having the anion corresponding to the halide of the crystal (typically $ScF_3$ or $ScCl_3$ dopants), e.g., scandium fluoride ($ScF_3$) would be added to a melt of calcium fluoride.

In procedural step 202, the $Sc^{3+}$ doped crystals may be fabricated by any method which yields good optical quality crystals. For example, crystals may be grown using existing processing techniques by a crystal manufacturer, such as OPTOVAC, Inc., located in North Brookfield, Mass.

After growing the $Sc^{3+}$ doped crystal in procedural step 202, three different techniques may be used to transform $Sc^{3+}$ ion impurities into $Sc^{2+}$ ions impurities. These different techniques are indicated by Roman numerals I, II, and III in FIG. 2. Technique I uses ionizing irradiation to transform the Sc ion impurities and includes procedural steps 210, 212 and 214. Technique II uses additive coloration, and technique III uses electrolytic coloration. Both technique II and technique III include procedural steps 204, 206 and 208.

In technique I, the doped crystal grown in procedural step 202 is first mechanically polished in procedural step 210. The polished crystal is then radiated with ionizing irradiation in procedural step 212 to transform $Sc^{3+}$ ion impurities into $Sc^{2+}$ ion impurities. Procedural step 212 may include exposing the polished crystal to γ-rays from a $Co^{60}$ source at doses that will produce a desired concentration of $Sc^{2+}$ ions. Other radiation sources may also be used, such as X-rays or high energy electrons. The irradiation of the crystal may be performed at temperatures corresponding to low mobility of the anion vacancies in the particular crystal lattice in order to prevent a formation of the aggregate color centers, which cause parasitic absorption at the frequencies of $Sc^{2+}$ emission. The irradiation of the crystal may also be performed at room temperature with a subsequent photo-treatment or thermo-treatment to destroy parasitic color centers as indicated by procedural step 214.

In techniques II and III, the doped crystal grown in procedural step 202 is first subjected to additive coloration (technique II) or to electrolytic coloration (technique III) in procedural step 204 to transform $Sc^{3+}$ ion impurities into $Sc^{2+}$ ion impurities. For technique II (additive coloration) or technique III (electrolytic coloration), the crystal is colored by sealing the crystal in a tube with alkali or alkali-earth metal at a temperature from 50 to 250 K below the crystal melt temperature for a duration from 5 minutes to 24 hours and a tension for the direct electric field of 0.0 to $1.0 \times 10^6$ V/m (absence of the electric field corresponds to additive coloration). The crystal is then subjected to thermal annealing in procedural step 206. In procedural step 206, the crystal may be wrapped in aluminum, stainless steel, nickel, or platinum foil, annealed for several minutes at elevated temperatures, and quenched to room temperature. The annealing step uniformly disperses the color centers that appear during coloration of the crystal and eliminates colloids. The foil is used to minimize crystal strains by reducing temperature gradients. After thermal annealing in procedural step 206, the crystal is mechanically polished in procedural step 208.

After a polished crystal is produced from techniques I, II or III, a characterization of the optical properties and losses of the crystal is conducted in procedural step 220. This characterization is conducted to determine if the resulting crystal has sufficient luminescent properties to be an active crystalline luminescent medium and, in particular, for use in a tunable laser system. If the characterization in procedural step 220 determines that the crystal has insufficient luminescent properties, the crystal may be reprocessed. For technique I, procedural steps 212 and 214 would be repeated. For technique II and technique III, procedural steps 206 and 208 would be repeated. Once the subsequent processing is completed, the characterization of optical properties and losses would again be done in procedural step 220.

Once procedural step 220 determines that the crystal possesses luminescent properties sufficient for an active crystalline luminescent media, the crystal may be used in an application as an active element in the dispersive cavity of a device, which is represented by procedural step 222.

The $Sc^{2+}$ ions in the active crystalline media according to the present invention feature a unique combination of the spectroscopic properties. In the $d^1$ electron configuration for the $Sc^{2+}$ ion configuration in crystals according to the present invention, as in $Ti^{3+}$ ion configuration in sapphire crystals, there are no energy levels above the upper laser level that will cause excited state absorption. An excited state absorption phenomenon strongly affects the duration of lasers based on transition metal doped crystals and results in the laser medium absorbing the laser radiation it generates. This absorption lowers the laser efficiency of the laser system and reduces the potential tuning range. The proposed active media are free from this shortcoming. These $Sc^{2+}$ based crystals of the present invention feature high (close to 100%) quantum efficiency of fluorescence and strong (cross sections of the transitions are of the order of $10^{-19}$ $cm^2$) and wide (thousands of $cm^{-1}$) absorption and luminescence transitions in the UV-visible range of the optical spectrum. These optical properties together with a unique $d^1$ electronic configuration for the $Sc^{2+}$ ions make crystals according to the present invention advantageous for active media for lasers tunable in the UV-visible spectral range.

The following EXAMPLE shows the advantageous luminescent properties of the $Sc^{2+}$ active crystalline luminescent media of the present invention. For the EXAMPLE below, a $CaF_2$ was chosen as the base crystal. It is understood, however, that the type of crystal lattice where $Sc^{2+}$ ion are formed may be changed by selecting different base materials for the crystal lattice as described above. A change to the crystal lattice will alter the maxima of the absorption and emission bands for the stimulated crystal. These bands may be manipulated to form maxima between a range from UV-blue to red range of the optical spectrum. It is further understood that the measurements made with respect to the $CaF_2$ base crystal below may be modified where appropriate, as would be known of skill in the art, to measure luminescent data for other base crystals. In addition, the calculations made with respect to the $CaF_2$ base crystal below could be modified where appropriate, as would be known of skill in the art, to calculate luminescent properties for other base crystals and to calculate concentrations and irradiation doses for other base crystals.

EXAMPLE $CaF_2$:$Sc^{2+}$ Active Crystalline Luminescent Media

Crystal growth was first accomplished. A single $CaF_2$ crystals was grown by a Stokbarger method in a fluoride atmosphere. Trivalent Sc ions were introduced as $ScF_3$. Large crystals of several centimeters long and about one centimeter in diameter were grown. These crystals were grown with different $Sc^{3+}$ concentrations from 0.00065 to 5.0 atomic percent. The $CaF_2:Sc^{3+}$ crystals with different $Sc^{3+}$ concentrations were polished and then γ-irradiated with a $Co^{60}$ source at room temperature at varying doses ranging from 1.0 to $10^5$ C/kg. This treatment created the $Sc^{2+}$ ion impurity optical centers that give rise to the absorption and emission bands of interest. The processing obtained $Sc^{2+}$ ion impurities in the concentration of 0.0004 to 5.0 atomic percent.

Figure 3:
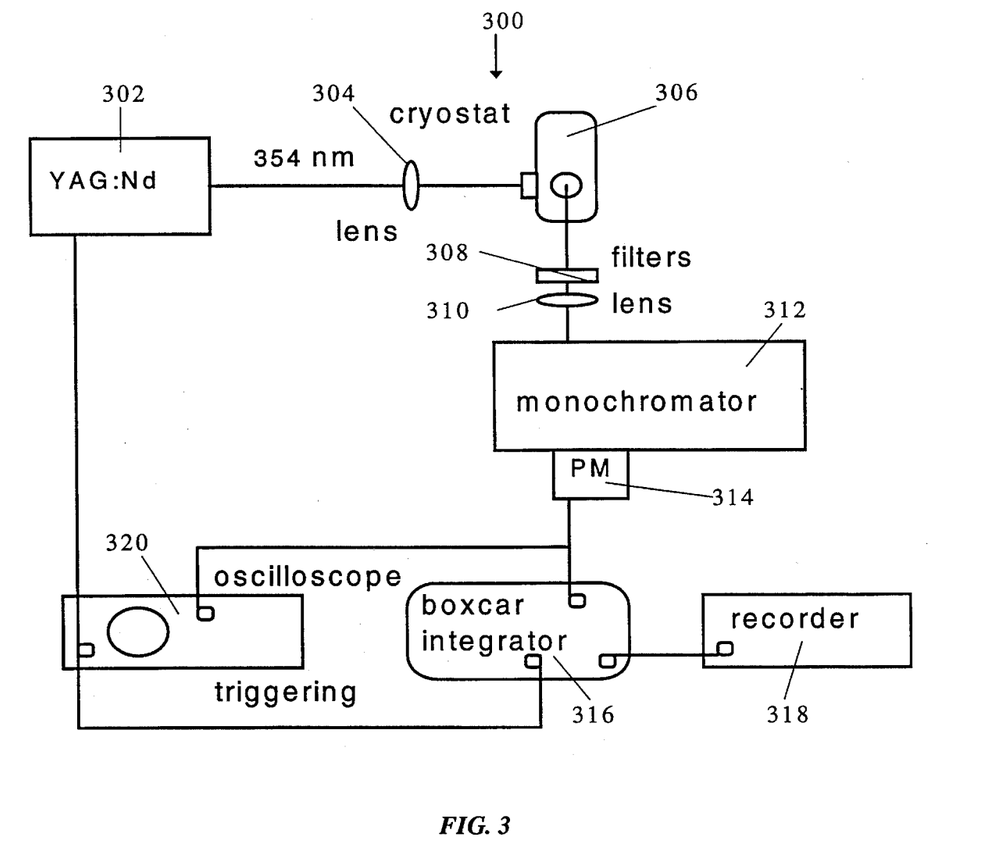
FIG. 3 is a block diagram of a measurement system for determining the optical luminescent properties of a $Sc^{2+}$ active crystalline medium according to the present invention.

FIG. 3 shows a block diagram of luminescence testing system 300 used for determining the luminescent characteristics for the $CaF_2:Sc^{2+}$ doped active crystalline luminescent media. Test system 300 may be used to provide a luminescence spectra and a kinetics of luminescence for $Sc^{2+}$ doped active crystalline media according to the present invention. Fluorescence was excited by radiations from the third harmonic (354 nm) of YAG:Nd laser 302. (A nitrogen laser may also be used.) For testing other $Sc^{2+}$ doped crystalline media, Raman shifted output radiation of YAG:Nd laser 302 can be used. The 354 nm radiation was focussed with lens 304 and directed to cryostat 306. The $CaF_2:Sc^{2+}$ crystalline medium samples were installed into cryostat 306, and measurements were carried out either at room or liquid nitrogen temperatures set by cryostat 306. The fluorescence output of the samples was filtered with filters 308, focussed with lens 310, and fed to monochromator 312. The fluorescence was recorded by photomultiplier ("PM") 314, which was selected to be sensitive in the UV-visible spectral range. A combination of boxcar integrator 316 and recorder 318 were attached at the end of monochromator 312 and PM 314. Oscilloscope 320 was attached to the output of PM 314 and was triggered synchronously with boxcar integrator 316.

PM 314 may be a FEU-79 PM (Russian made), which is sensitive in the UV-visible range of the optical spectrum (200–650 nm). An analogous photomultiplier may also be used, such as Oriel Model #77345, which is available from ORIEL Corporation (P.O. Box 872, Stratford, Conn. USA 06497). Boxcar integrator 316 may be a PAR 162, which is available from EG&G INSTRUMENTS, Princeton Applied Research (Box 2565, Princeton, N.J., USA 08543-2565). Recorder 318 may be any analog signal recorder or digital computer data acquisition system. Monochromator 312 may be any monochromator with a spectral resolution better than 0.5 nm, for example, a MDR-23(St. Petersburg Optics & Mechanical Union, Russia) or SpectraPro-500, which is available from Acton Research Corporation (P.O. Box 2215, 525 Main Street, Acton, Mass. USA 01720). Cryostat 306 may be a F-104, which is available from Oxford Instruments, Scientific Research (Eynsham, Oxford, OX8 1TL United Kingdom).

Figure 4:
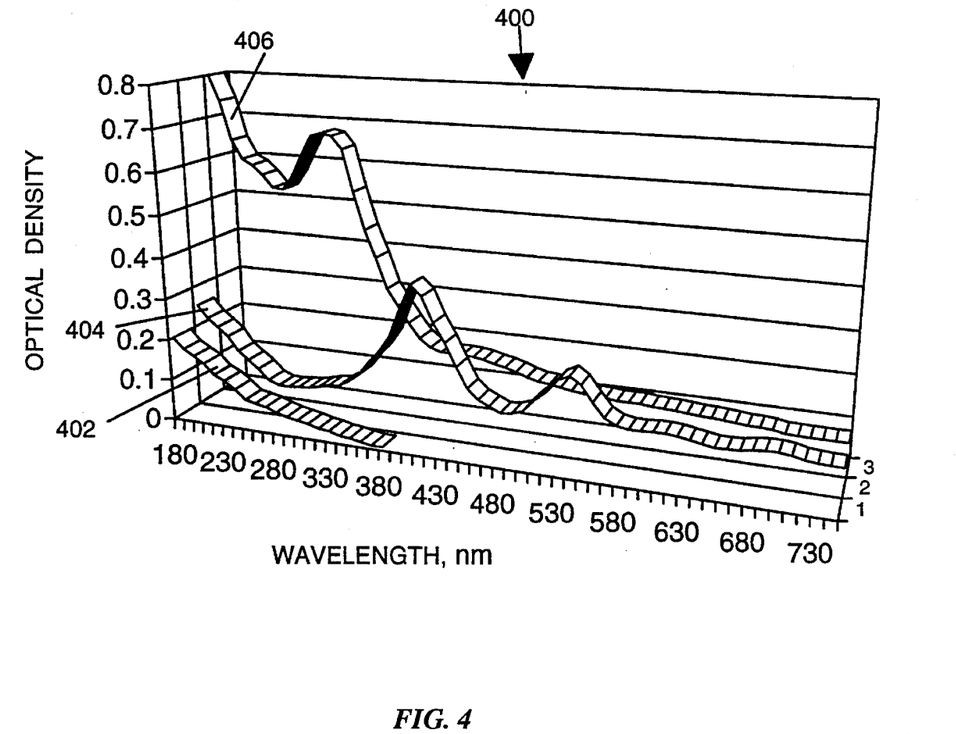
FIG. 4 is a graph comparing the absorption spectra for a $Sc^{2+}$ active crystalline luminescent medium according to the present invention with absorption spectra for other crystals.

FIG. 4 is a graph comparing the absorption spectra for a $Sc^{2+}$ doped active crystalline luminescent medium according to the present invention with absorption spectra for other crystals. Graph 400 compares the absorption spectrum, measured at room temperature, for various crystals. The horizontal axis of graph 400 represents the wavelength, and the vertical axis represents optical density. Data line 406 represents the absorption spectrum for a $CaF_2:Sc^{2+}$ active crystalline luminescent medium according to the present invention. Data line 402 represents the absorption spectra for a pure (undoped) non-irradiated $CaF_2$ crystal. Data line 404 represents the absorption spectra for a pure (undoped) irradiated $CaF_2$ crystal. The $CaF_2:Sc^{2+}$ crystal measured for data line 406 had an initial 0.01 atomic percent concentration of $Sc^{3+}$ ions. The crystal was then γ-irradiated with a dose of $10^3$ C/kg. The pure $CaF_2$ crystal measured for data line 404 was γ-irradiated with a dose of $10^3$ C/kg. Comparing data lines 402 and 404, the absorption band at 390 nm for the irradiated $CaF_2$ crystal is due to F and $F_2$ color centers, and the absorption band at 540 nm is due to $F_2$ color centers. Comparing data lines 404 and 406, the intensive absorption band with a maximum at 290 nm for the $CaF_2:Sc^{2+}$ crystal is due to the $Sc^{2+}$ ion absorption, because this band is absent on the absorption spectra for the pure non-irradiated $CaF_2$ crystal and the pure irradiated $CaF_2$ crystal. This absorption band is not typical for color centers in calcium fluoride, because of its spectral position, and has a radiative lifetime of 1.2 μsec that is too long for such color centers (see discussion of FIG. 7 below).

Figure 5:
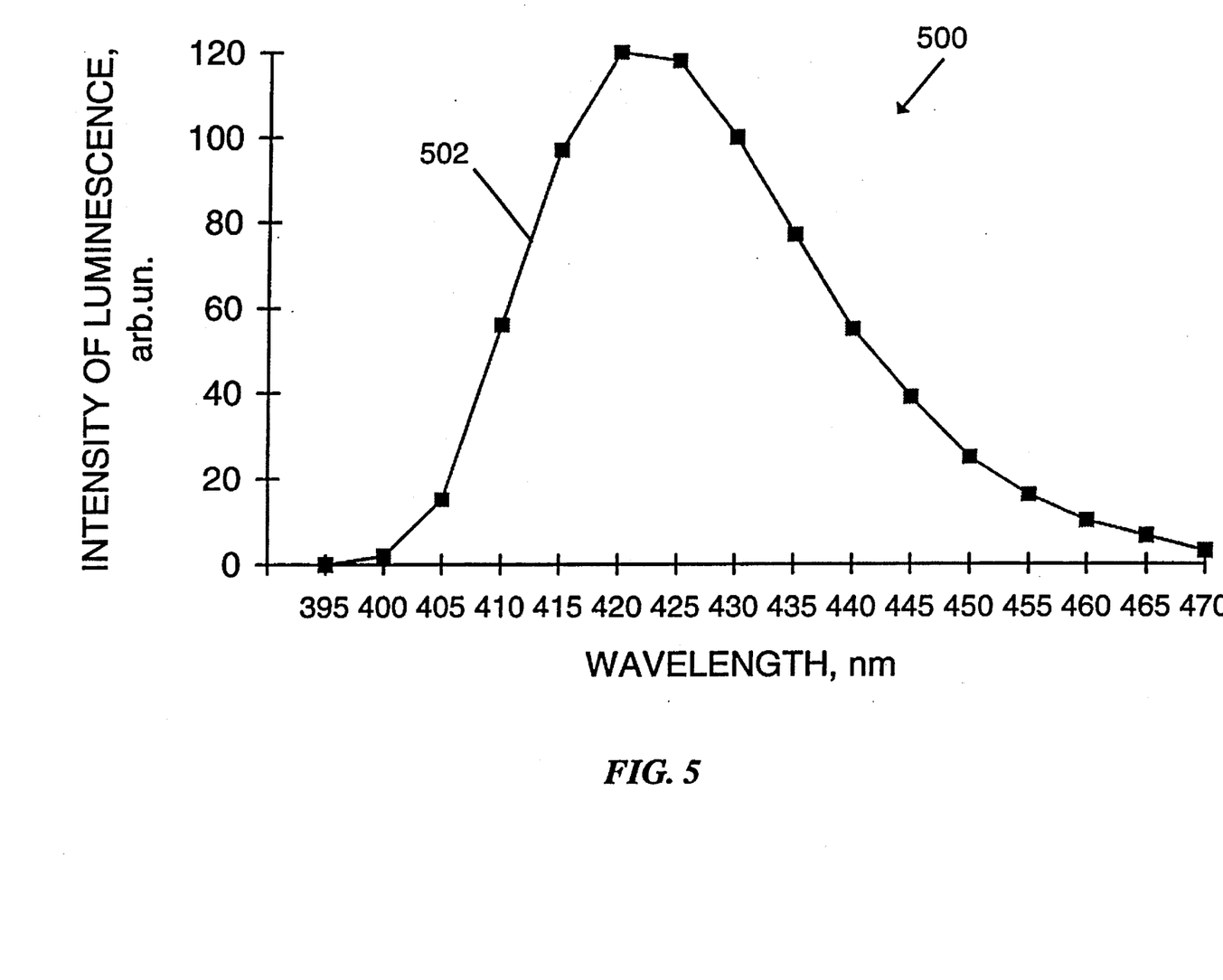
FIG. 5 is a graph of the room temperature luminescence spectrum for a $Sc^{2+}$ active crystalline luminescent medium according to the present invention.

FIG. 5 is the fluorescence spectrum of an active crystalline media according to the present invention. Graph 500 shows the intensity of luminescence measured for a $CaF_2:Sc^{2+}$ crystal, which had an initial concentration of 0.01 atomic percent concentration of $Sc^{3+}$ ion impurities and was γ-irradiated with a dose of $10^3$ C/kg. The horizontal axis for graph 500 represents wavelength, and the vertical axis represents the intensity of luminescence in arbitrary units. Data line 502 shows that the fluorescence spectrum for the $CaF_2:Sc^{2+}$ crystal measured is well described by a gaussian profile with a half width of 1500 $cm^{-1}$ and a maximum at 425 nm.

Figure 6A:
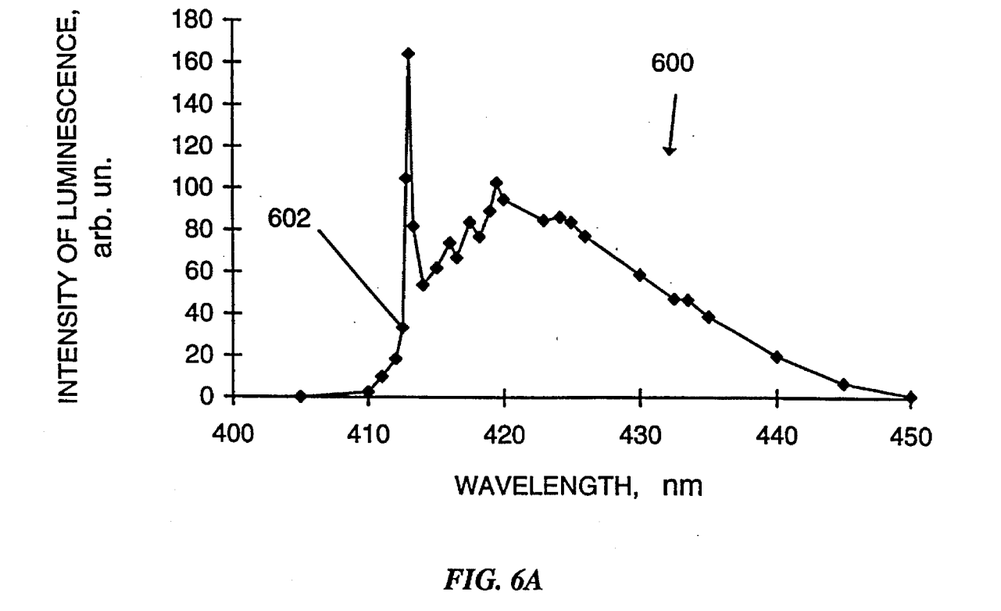
FIG. 6A is a graph of the liquid nitrogen temperature luminescence for a $Sc^{2+}$ active crystalline luminescent medium according to the present invention.
Figure 6B:
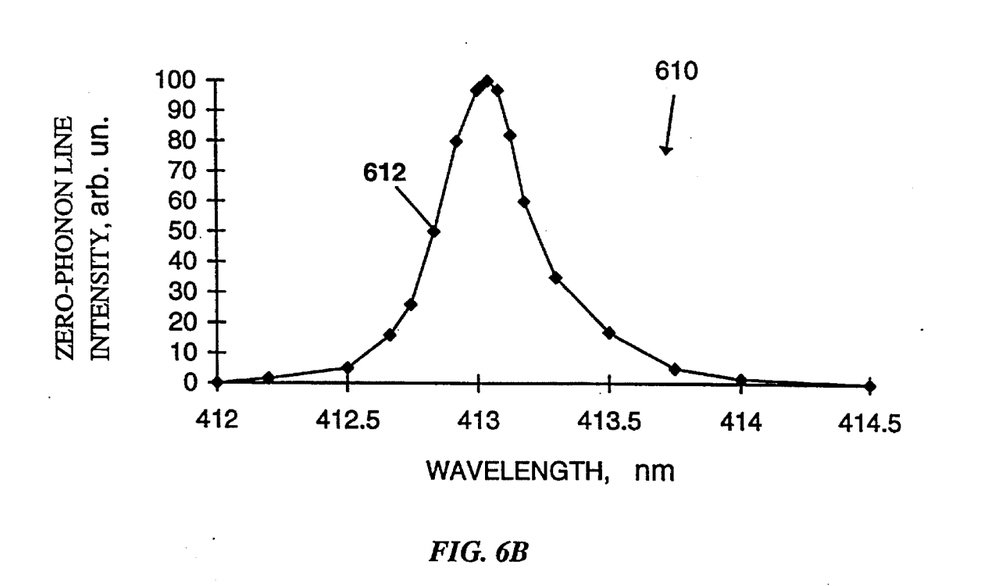
FIG. 6B is a graph of the zero-phonon line intensity for a $Sc^{2+}$ frequency crystalline luminescent medium according to the present invention.

FIG. 6A demonstrates the intensity of luminescence (in arbitrary units) of the same $Sc^{2+}$ doped crystal. In particular, data line 602 in graph 600 shows a low temperature (T=77K) fluorescent spectra for the crystal. FIG. 6B is a graph of the zero-phonon line intensity (in arbitrary units). Looking to data line 612 in graph 610, the spectra is shown to have a typical zero-phonon line with a maximum at a wavelength of 413 nm and a half width of 23 $cm^{-1}$. These low temperature spectra measurements were made utilizing the cryostat at liquid nitrogen temperature. The horizontal axes for graph 600 and graph 610 represent wavelength.

Figure 7:
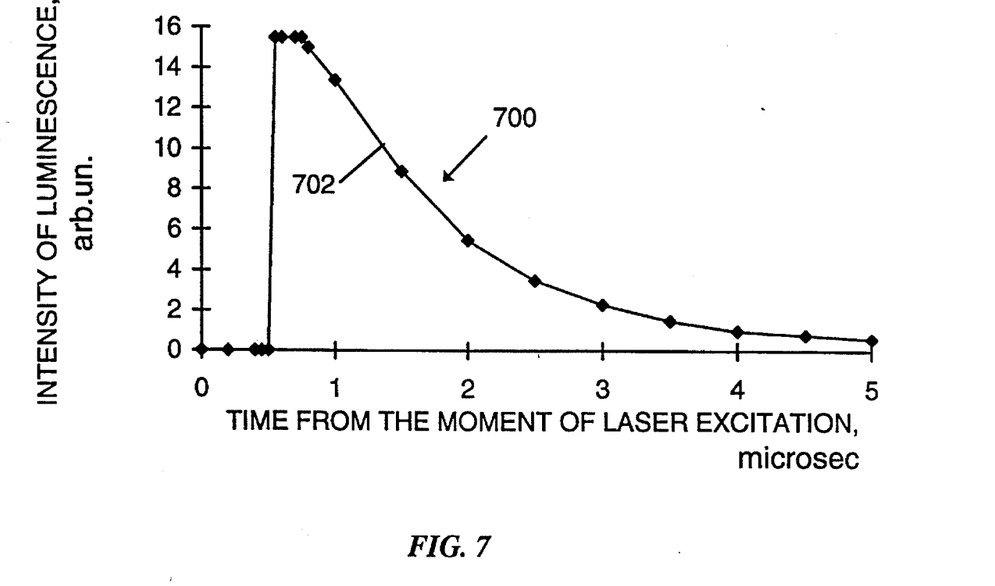
FIG. 7 is a graph of the kinetic of luminescence for a $Sc^{2+}$ active crystalline luminescent medium according to the present invention.

FIG. 7 is a graph of the kinetics of fluorescence at either room temperature or liquid nitrogen temperature for a $CaF_2:Sc^{2+}$ active crystalline media according to the present invention. Looking to data line 702 in graph 700, the kinetics of fluorescence at both temperatures is shown to be exponential with the same lifetime of 1.15 μsec. The horizontal axis of graph 700 is the time from the moment of laser excitation of the crystal, and the vertical axis is the intensity of luminescence (in arbitrary units). Further, the equality of the lifetimes measured at room and liquid nitrogen temperatures demonstrate a high, close to 100% quantum efficiency for the fluorescence in the $CaF_2:Sc^{2+}$ active crystalline media tested.

Based upon the above measured spectroscopic data for the $CaF_2:Sc^{2+}$ crystals, it is possible to calculate the cross section of the stimulated emission and laser threshold conditions (represented by $\sigma_e$) and the threshold density of the pumping energy (represented by $W_{thr}$). The $\sigma_e$ calculation was carried out assuming a small laser pump pulse duration (represented by $t_p$), which was much less than $Sc^{2+}$ lifetime (represented by τ). The calculation was made in accordance with the following well known formula for a gaussian profile of an emission band:

$$\sigma_e = 2\sqrt{(\ln 2)/\pi} \cdot \lambda^2 \eta / 8\pi n^2 \tau \Delta \nu_e \quad \text{[Equation 1]}$$

For this calculation, λ=425 nm (the wavelength of maximum of fluorescence band); η=1 (the quantum efficiency of fluorescence); τ=1.15 μsec (the Sc$^{2+}$ lifetime); n =1.43(the CaF$_2$ refractive index); and Δv$_e$=1500 cm-1(the half width for Sc$^{2+}$ ion fluorescence band at room temperature).

The result of the calculation of Equation 1 is σ$_e$=6×10$^{-19}$ cm$^2$. This result is adequately high for the emission cross section to demonstrate that the tested CaF$_2$:Sc$^{2+}$ crystalline medium according to the present invention is suitable as an active crystalline luminescent medium. In comparison, the emission cross sections for Ti-doped sapphire active media and Cr-forsterite active media, arguably the most well known active media, are 3.9×10$^{-19}$ and 1.5×10$^{-19}$ cm$^2$, respectively.

The laser threshold conditions may be calculated using the following equation:

$$1=R_1R_2 \cdot \exp[2(\Delta N \cdot \sigma_e - \alpha_1)d] \quad \text{[Equation 2]}$$

The relation between the concentration of the excited particles (represented by ΔN) and the threshold density of the pumping laser radiation (represented by W$_{thr}$) is expressed by the following equation:

$$\Delta N = W_{thr} \cdot (1-T)/h\nu d \quad \text{[Equation 3]}$$

Using the value for σ$_e$ obtained from Equation 1 in Equation 2, and Equation 3, relating ΔN and W$_{thr}$, the threshold density of the pumping laser radiation may be calculated using the following equation:

$$W_{thr} = 2\pi \sqrt{\pi/\ln 2} \cdot n^2 \Delta v_e \cdot h\nu\tau/\lambda^2 \eta(1-T) \cdot (\ln 1/R_1R_2 + 2\alpha_1 d) \quad \text{[Equation 4]}$$

For this equation, R$_1$=R$_2$=1(reflection coefficients for the laser mirrors); α$_1$=0.6 cm$^{-1}$ (losses on the frequency of the expected generation); d=0.4 cm (the length of the active element); T=50% (transmittance of the active element at the wavelength of pumping radiation); and hv=5.6×10$^{-19}$ J (energy of pumping photons). Utilizing the above equations, the value for W$_{thr}$ is calculated to be 0.5 J/cm$^2$.

The laser threshold conditions, obtained from the spectroscopic data and calculated using the above equations, are favorable for CaF$_2$:Sc$^{2+}$ crystals under nanosecond pumping with the radiation of the third harmonic of a neodymium laser. This conclusion follows from the fact that the calculated threshold pumping density is much less than the value that would cause optical damage in the CaF$_2$ host crystal, which amounts to 5-15 J/cm$^2$ for the level of losses at the frequency of expected generation—0.6 cm$^{-1}$.

Sc$^{2+}$ spectroscopic characteristics and transmittance coefficient measurements in calcium fluoride crystals were also measured after more than two months storage at room temperature. These measurements demonstrated that there were no noticeable degradation of the optical centers after the long periods of storage. This lack of degradation indicates satisfactory thermostability of the optical centers. Further, the optical stability of active Sc$^{2+}$ centers did not change for up to 10$^4$ pulses using a pumping laser radiation having a wavelength of 354 nm and an energy density of 0.5 J/cm$^2$.

For adequate laser properties, the CaF$_2$:Sc$^{2+}$ active crystalline luminescent media according to the present invention must have an initial Sc$^{3+}$ ion impurity concentration of 0.00065 to 5.0 atomic percent. After processing, the Sc$^{2+}$ concentration must be 0.0004 to 5.0 atomic percent. The basis for these ranges for the Sc$^{3+}$ and Sc$^{2+}$ concentrations given above was determined as follows.

The lowest concentration of the Sc$^{2+}$ ions followed from the fact that it is not reasonable to have active crystalline luminescent media with a coefficient of absorption in the maximum of absorption band (represented by k) of less than 0.06 cm$^{-1}$. At this absorption coefficient value, active media with a length 1 cm under longitudinal pumping will absorb only 5 percent of the pumping laser radiation. Reasonable absorption of the pumped energy, which is approximately 70%, may be achieved, therefore, only with a very long crystal of approximately 20 cm in length.

The necessary concentration of ion impurities may be determined for this value of k from the following equation:

$$k=\sigma_a \cdot N \quad \text{[Equation 5]}$$

In this equation, σ$_a$ represents the cross section of the absorption; and N represents the concentration of Sc$^{2+}$ ions in cm$^3$. Assuming that σ$_a$=σ$_e$=6×10$^{-19}$ cm$^2$, as calculated above, the value for N is calculated to be ~10$^{17}$ cm$^{-3}$.

This value corresponds to 2·10$^{-4}$ percent by weight and ≈4·10$^{-4}$ atomic percent of Sc$^{2+}$ ions in calcium fluoride. These data can be easily obtained on the basis of the following considerations.

The weight percent may be calculated as follows. First, consider a volume V=1 cm$^3$ of CaF$_2$ crystal, having a mass m=ρV=3.18 (g/cm$^3$)×1(cm$^3$)=3.18 g and mole quantity n=m/M=3.18/78.08=0.04 mole, where ρ is CaF$_2$ crystal density and M=78.08 (the molecular weight). It is known that 1 mole of any substance contains 6.023·10$^{23}$ structural elements and, therefore, 0.04 mole of CaF$_2$ should contain 0.245·10$^{23}$ structural elements. Equation 5 provided that the minimal concentration for practical active crystalline luminescent medium of Sc$^{2+}$ in CaF$_2$ was approximately 10$^{17}$ particles in 1 cm$^3$. A proportion can be written relating the amount of CaF$_2$ and quantity of its structural elements in the unit volume of 1 cm$^3$ from one side and the amount of Sc$^{2+}$ and its concentration in the same volume from another side as follows:

amount of CaF$_2$ in 1 cm$^3$ is n=m/M=0.245·10$^{23}$ cm$^{-3}$ amount of Sc$^{2+}$ in 1 cm$^3$ is n*=m*/M* =10$^{17}$ cm$^{-3}$ [Proportion 1]

where m* is the mass, and M* =44 is the molecular weight of Sc$^{2+}$. Proportion 1 gives us a value of m/m*:

$$\frac{m}{m^*} \rightarrow \frac{0.245 \cdot 10^{23} \times M}{10^{17} \times M^*} = \frac{0.245 \cdot 10^{23} \times 78.08}{10^{17} \times 44} = 0.435 \cdot 10^6 \quad \text{[Proportion 2]}$$

Weight percent (W(%)), which is equal to $$W(\%) = \frac{m^* \cdot 100(\%)}{m^* + m} = \frac{100(\%)}{1 + m/m^*} \quad \text{[Equation 6]}$$

can be easily calculated from Proportion 2 and amounts to ~2·10$^{-4}$%.

Atomic percent (X(%)) may be calculated as follows. Taking into account Proportion 1 and molecular weights of the components, X(%) can be easily calculated:

$$X(\%) = \frac{n^* \cdot 100\%}{n^* + n} = \frac{100\%}{1 + m \cdot M^*/m^* \cdot M} \approx 4 \cdot 10^{-4}\%$$

Figure 8:
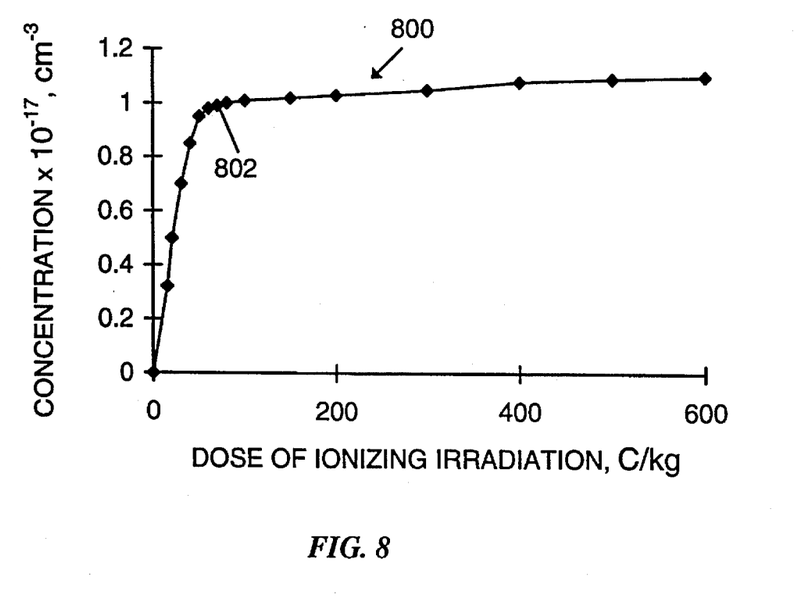
FIG. 8 is a graph of the $Sc^{2+}$ concentration versus the dose of ionizing irradiation for a $Sc^{2+}$ active crystalline luminescent medium according to the present invention.

FIG. 8 is a graph of a fragment of the radiation dose dependence of the Sc$^{2+}$ ion concentration for a CaF$_2$ crystal with an initial Sc$^{3+}$ ion concentration of 0.00065 atomic percent. Looking to data line 802 in graph 800, a saturation effect in Sc$^{3+}$ to Sc$^{2+}$ transformation starting at doses of 70–100 C/kg and resulting in a formation of 10$^{-17}$ cm$^{-3}$ of Sc$^{2+}$ particles is apparent. This concentration of Sc$^{2+}$ particles represents the smallest reasonable concentration of the active $Sc^{2+}$ optical centers, based upon the spectroscopic and laser parameters. Thus, the smallest reasonable concentration for the original trivalent $Sc^{3+}$ ions amounts to 0.00065 atomic percent.

The efficiency of the $Sc^{3+} \Longrightarrow Sc^{2+}$ transformation depends upon the type of coloration, dose of radiation and on the initial $Sc^{3+}$ ion concentration. For a $Sc^{3+}$ ion original concentration of 0.00065 atomic percent, FIG. 8 demonstrates the efficiency of $Sc^{3+} \Longrightarrow Sc^{2+}$ transformation exceeding 60%. In contrast, the $Sc^{3+} \Longrightarrow Sc^{2+}$ transformation efficiency may practically reach 100% for additive or electrolytic coloration. Further, the efficiency of transformation dramatically decreases for ionizing irradiation of highly concentrated crystals. For example, for initial $Sc^{3+}$ concentrations of 5.0 atomic percent the maximum efficiency of the $Sc^{3+} \Longrightarrow Sc^{2+}$ transformation exceeds only 1% at a dose $10^3$ C/kg.

In conclusion, the smaller the concentration of the original $Sc^{3+}$ ions, the smaller dose of ionizing irradiation is required for efficient $Sc^{3+} \Longrightarrow Sc^{2+}$ transformation. From this fact, it is possible to choose a minimal level for the ionizing irradiation that is required for the formation of active media with a minimal $Sc^{2+}$ concentration. As shown in FIG. 8, the smallest optimal dose of ionizing treatment is 60–100 C/kg. Experiments showed that this dose interval may be shifted towards 1–10 C/kg, due to optimization of the temperature of the crystal during irradiation. Treatment with doses exceeding 100 C/kg is not reasonable due to saturation in the process of the $Sc^{3+} \Longrightarrow Sc^{2+}$ transformation and formation of additional color center absorption, causing losses in the frequencies of $Sc^{2+}$ emission.

Figure 9:
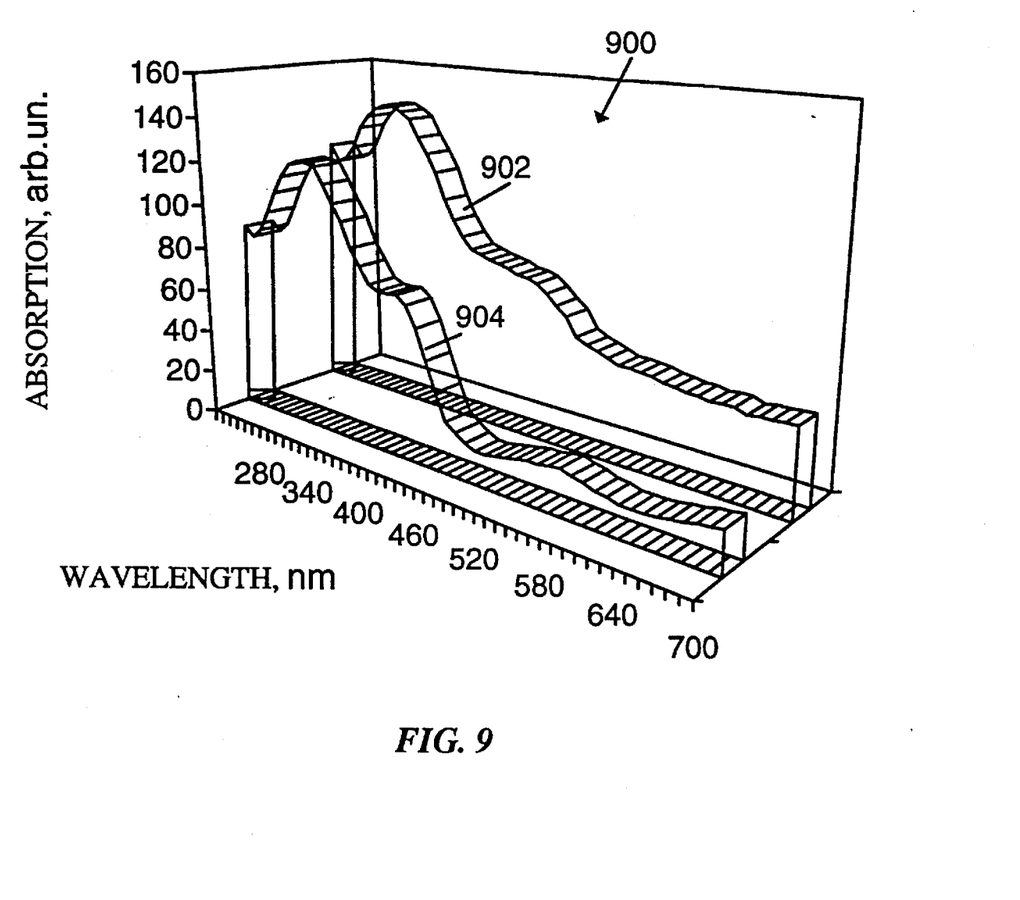
FIG. 9 is a graph of the absorption spectra for a $Sc^{2+}$ active crystalline luminescent medium according to the present invention irradiated with different doses of gamma radiation.

FIG. 9 is a graph of the absorption spectra of $CaF_2:Sc^{2+}$ crystals according to the present invention. Data line 902 of graph 900 shows the absorption spectra for $CaF_2:Sc^{2+}$ crystals having an initial $Sc^{3+}$ concentration of 5.0 atomic percent and having been γ-irradiated with a dose of $10^5$ C/kg. Data line 904 of graph 900 shows the absorption spectra for $CaF_2:Sc^{2+}$ crystals having an initial $Sc^{3+}$ concentration of 5.0 atomic percent and having been γ-irradiated with a dose of 100 C/kg. It is seen that even at optimal doses of ionizing irradiation (e.g. 100 C/kg), $CaF_2$ crystals have a very strong parasitic color center absorption band (i.e. 400 nm) that strongly overlaps with a spectral region of expected generation. Thus 5.0 atomic percent may be considered to be a good approximation for the highest reasonable concentration of $Sc^{3+}$ ion impurities in doped $CaF_2$ active crystalline media. At doses more than $10^5$ C/kg, the level of parasitic losses becomes too close to the value of active $Sc^{2+}$ absorption. At these elevated levels of parasitic losses, the efficiency of the active media is inadequate. Thus, $10^5$ C/kg may be considered as the maximum dose for the ionizing inadequate.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A tunable laser system having output radiation tunable in the UV-visible spectral range, comprising:

a pumping system;

an $Sc^{2+}$ active crystalline luminescent medium coupled to said pumping system to receive pumping radiation from said laser pumping system and to emit output radiation in the UV-visible spectral range, said active crystalline luminescent medium being an alkali-earth-halide crystal having $Sc^{2+}$ ion impurities providing stable luminescent optical centers and having a $d^1$ electron configuration which provides no energy levels above an upper laser level that will cause losses due to excited state absorption; and a dispersive system coupled to said laser pumping system and said $Sc^{2+}$ active crystalline luminescent medium to tune said output radiation in the UV-visible spectral range.

2. The tunable laser system of claim 1, wherein said alkali-earth-halide crystal has the formula MeHa wherein:

Me is an alkali-earth metal selected from a group consisting of Ca, Sr, Ba and Mg; and Ha is a halide combination selected from a group consisting of $F_2$, $Cl_2$ and FCl.

3. The tunable laser system of claim 2, wherein Me is Ca; Ha is $F_2$, and said $Sc^{2+}$ ion impurities have a concentration of approximately 0.0004 to 5.0 atomic percent.

4. The tunable laser system of claim 1, wherein said alkali-earth-halide crystal has the formula $M_xMe_{1-x}Ha$ (0<x<1) wherein:

M is an alkali-earth metal selected from a group consisting of Ca, Sr, Ba and Mg;

Me is an alkali-earth metal selected from a group consisting of Ca, Sr, Ba and Mg, excluding said alkali-earth metal selected for M; and Ha is a halide selected from a group consisting of $F_2$, $Cl_2$ and FCl.

5. The tunable laser system of claim 1, wherein said alkali-earth-halide crystal has the formula $MMeF_3$ wherein:

M is an alkali metal selected from a group consisting of Li, Na and K; and

Me is an alkali-earth metal selected from a group consisting of Ca, Sr, Ba, Mg and Zn.

6. An $Sc^{2+}$ active crystalline luminescent medium, comprise:

an alkali-earth-halide crystal having $Sc^{2+}$ ion impurities providing stable luminescent optical centers and having a $d^1$ electron configuration which provides no energy levels above an upper laser level that will cause losses due to excited state absorption.

7. The $Sc^{2+}$ active crystalline luminescent medium of claim 6 wherein said alkali-earth-halide crystal has the formula MeHa wherein:

Me is an alkali-earth metal selected from a group consisting of Ca, Sr, Ba and Mg; and Ha is a halide combination selected from a group consisting of $F_2$, $Cl_2$ and FCl.

8. The $Sc^{2+}$ active crystalline luminescent medium of claim 6 wherein Me is Ca; Ha is $F_2$, and said $Sc^{2+}$ ion impurities have a concentration of approximately 0.0004 to 5.0 atomic percent.

9. The $Sc^{2+}$ active crystalline luminescent medium of claim 6 wherein said alkali-earth-halide crystal has the formula $M_xMe_{1-x}Ha$ (0<x<1) wherein:

M is an alkali-earth metal selected from a group consisting of Ca, Sr, Ba and Mg;

Me is an alkali-earth metal selected from a group consisting of Ca, Sr, Ba and Mg, excluding said alkali-earth metal selected for M; and Ha is a halide selected from a group consisting of $F_2$, $Cl_2$ and FCl.

10. The $Sc^{2+}$ active crystalline luminescent medium of claim 6 wherein said alkali-earth-halide crystal has the formula $MMeF_3$ wherein:

M is an alkali metal selected from a group consisting of Li, Na and K; and

Me is an alkali-earth metal selected from a group consisting of Ca, Sr, Ba, Mg and Zn.

11. A method for fabricating an $Sc^{2+}$ active crystalline luminescent medium, comprising:

producing an alkali-earth-halide crystal having $Sc^{3+}$ ion impurities; and processing said alkali-earth-halide crystal to transform said $Sc^{3+}$ ion impurities into $Sc^{2+}$ stable luminescent optical centers said $SC^{2+}$ ions having a $d^1$ electron configuration which provides no energy levels above an upper laser level that will cause losses due to excited state absorption.

12. The method of claim 11 wherein said processing step, comprises:

processing said alkali-earth-halide crystal to transform substantially all of said $Sc^{3+}$ ion impurities into $Sc^{2+}$ stable luminescent optical centers.

13. The method of claim 11 wherein said producing step, comprises: growing an alkali-earth-halide crystal from a melt doped with $Sc^{3+}$ ion impurities.

14. The method of claim 11 wherein said processing step, comprises:

polishing said alkali-earth-halide crystal;

irradiating said alkali-earth-halide crystal with ionizing irradiation to transform $Sc^{3+}$ ion impurities into $Sc^{2+}$ ion impurities; and subjecting said irradiated alkali-earth-halide crystal with photo-treatment and thermo-annealing 15. The method of claim 11 wherein said processing step, comprises:

processing said alkali-earth-halide crystal with additive or electrolytic coloration to transform $Sc^{3+}$ ion impurities into $Sc^{2+}$ ion impurities;

processing said colored alkali-earth-halide crystal with thermal annealing; and polishing said alkali-earth-halide crystal.

16. The method of claim 11 wherein said producing step, comprises:

producing an alkali-earth-halide crystal having $Sc^{3+}$ ion impurities, said alkali-earth-halide crystal having the formula MeHa wherein:

Me is an alkali-earth metal selected from a group consisting of Ca, Sr, Ba and Mg; and Ha is a halide combination selected from a group consisting of $F_2$, $Cl_2$ and FCl.

17. The method of claim 16 wherein said producing step, comprises:

producing an alkali-earth-halide crystal having $Sc^{3+}$ ion impurities, said alkali-earth-halide crystal having the formula $CaF_2$.

18. The method of claim 17, wherein said processing step comprises:

processing said $CaF_2$ crystal to transform said $Sc^{3+}$ ion impurities into $Sc^{2+}$ stable luminescent color centers having a concentration of approximately 0.0004 to 5.0 atomic percent.

19. The method of claim 18, wherein said processing step comprises: polishing said $CaF_2$ crystal;

irradiating said $CaF_2$ crystal with a dose of ionizing irradiation from 1 to $10^5$ C/kg to transform $Sc^{3+}$ ion impurities into $Sc^{2+}$ ion impurities; and subjecting said irradiated $CaF_2$ crystal with photo-treatment and thermo-annealing.

20. The method of claim 11 wherein said producing step, comprises:

producing an alkali-earth-halide crystal having $Sc^{3+}$ ion impurities, said alkali-earth-halide crystal having the formula $M_xMe_{1-x}Ha$ ($0<x<1$) wherein:

M is an alkali-earth metal selected from a group consisting of Ca, Sr, Ba and Mg;

Me is an alkali-earth metal selected from a group consisting of Ca, Sr, Ba and Mg, excluding said alkali-earth metal selected for M; and Ha is a halide combination selected from a group consisting of $F_2$, $Cl_2$ and FCl.

21. The method of claim 11 wherein said producing step, comprises:

producing an alkali-earth-halide crystal having $Sc^{3+}$ ion impurities, said alkali-earth-halide crystal having the formula $MMeF_3$ wherein:

M is an alkali metal selected from a group consisting of Li, Na and K; and

Me is an alkali-earth metal selected from a group consisting of Ca, Sr, Ba, Mg and Zn.

* * * * *

UNITED STATES PATENT AND TRADEMARK OFFICE
CERTIFICATE OF CORRECTION

PATENT NO.   :   5,471,493

DATED        :   November 28, 1995

INVENTOR(S)  :   Mirov et al.

It is certified that error appears in the above-identified patent and that said Letters Patent is hereby corrected as shown below:

In claim 6, column 14, lines 45 and 46, delete "comprise:" and insert ----comprising:-- therefor.

In claim 11, column 15, line 21, delete "centers said" and insert --centers, said-- therefor.

Signed and Sealed this

Twelfth Day of March, 1996

Attest:

BRUCE LEHMAN

Attesting Officer

Commissioner of Patents and Trademarks